US009567099B2

(12) United States Patent
Poux et al.

(10) Patent No.: US 9,567,099 B2
(45) Date of Patent: Feb. 14, 2017

(54) AIRCRAFT FLIGHT MANAGEMENT DEVICES, SYSTEMS, COMPUTER READABLE MEDIA AND RELATED METHODS

(71) Applicant: Airbus Operations SAS (France), Toulouse (FR)

(72) Inventors: Thibaut Poux, Toulouse (FR); Sébastien Giuliano, Toulouse (FR); Sébastien Drieux, Toulouse (FR); Carole Metais, Tournefeuille (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 13/861,052

(22) Filed: Apr. 11, 2013

(65) Prior Publication Data

US 2014/0309821 A1    Oct. 16, 2014

(51) Int. Cl.
    *B64D 45/00*    (2006.01)
    *G08G 5/00*    (2006.01)

(52) U.S. Cl.
    CPC ............. *B64D 45/00* (2013.01); *G08G 5/0021* (2013.01); *G08G 5/0056* (2013.01)

(58) Field of Classification Search
    CPC .................................................. G06Q 10/047
    USPC ......................................... 701/14, 120, 3, 4
    See application file for complete search history.

(56) References Cited

U.S. PATENT DOCUMENTS

| 812,174 A | 2/1906 | Grundal |
| 4,538,229 A * | 8/1985 | Baltzer et al. ................... 701/16 |
| 4,807,158 A | 2/1989 | Blanton et al. |
| 5,648,755 A | 7/1997 | Yagihashi |

(Continued)

FOREIGN PATENT DOCUMENTS

| EP | 0562929 | 9/1993 |
| EP | 2063227 | 5/2009 |

(Continued)

OTHER PUBLICATIONS

French Search Report for FR 1160884 dated Jul. 5, 2012.

(Continued)

*Primary Examiner* — Rami Khatib
*Assistant Examiner* — Nicholas K Wiltey
(74) *Attorney, Agent, or Firm* — Jenkins, Wilson, Taylor & Hunt, P.A.

(57) ABSTRACT

Aircraft flight management devices, systems, computer readable media, and related methods are provided. The present subject matter includes devices, systems, computer readable media, and related methods of providing flight management control during abnormal events and/or situations requiring diversion from the present mission. In some aspects, a system for providing flight management may include a computing platform with a processor, a memory, and a flight management application module (FMAM) configured to receive data from multiple servers. The FMAM may also calculate one or more aircraft ranges and/or diversion routes based upon the received data. In some aspects, systems and devices disclosed herein may be configured to provide diversion assistance by selectively displaying information including the map, one or more of the aircraft ranges, a vertical display, and information regarding one or more airports.

17 Claims, 8 Drawing Sheets

(56) References Cited

U.S. PATENT DOCUMENTS

| | | | |
|---|---|---|---|
| 5,842,142 A * | 11/1998 | Murray et al. | 701/16 |
| 5,936,552 A | 8/1999 | Wichgers et al. | |
| 5,978,715 A * | 11/1999 | Briffe et al. | 701/11 |
| 6,072,473 A | 6/2000 | Muller et al. | |
| 6,085,145 A | 7/2000 | Taka et al. | |
| 6,181,987 B1 * | 1/2001 | Deker et al. | 701/3 |
| 6,353,734 B1 * | 3/2002 | Wright et al. | 455/98 |
| 6,573,841 B2 * | 6/2003 | Price | 340/963 |
| 6,832,138 B1 | 12/2004 | Straub et al. | |
| 6,910,657 B2 | 6/2005 | Schneider | |
| D517,435 S | 3/2006 | Yamada | |
| 7,307,549 B2 | 12/2007 | Firra | |
| D559,260 S | 1/2008 | Noviello | |
| D563,977 S | 3/2008 | Carl et al. | |
| 7,343,229 B1 | 3/2008 | Wilson | |
| D579,458 S | 10/2008 | Nash et al. | |
| 7,577,501 B2 * | 8/2009 | Tafs et al. | 701/14 |
| D608,793 S | 1/2010 | Canu-Chiesa | |
| 7,693,621 B1 | 4/2010 | Chamas | |
| 7,702,427 B1 * | 4/2010 | Sridhar et al. | 701/4 |
| D615,100 S | 5/2010 | Canu-Chiesa | |
| 7,751,948 B2 | 7/2010 | Boorman et al. | |
| 7,765,061 B1 | 7/2010 | Barber et al. | |
| 7,830,275 B2 | 11/2010 | Hiraoka | |
| D634,332 S | 3/2011 | Spek | |
| 7,996,121 B2 * | 8/2011 | Ferro et al. | 701/11 |
| D644,651 S | 9/2011 | Spek | |
| D644,652 S | 9/2011 | Spek | |
| D644,653 S | 9/2011 | Spek | |
| D646,689 S | 10/2011 | Ulliot | |
| 8,078,343 B2 | 12/2011 | Ferreira et al. | |
| 8,108,087 B2 * | 1/2012 | Stone et al. | 701/16 |
| 8,217,807 B1 | 7/2012 | Carrico | |
| 8,234,068 B1 * | 7/2012 | Young et al. | 701/528 |
| 8,290,642 B2 * | 10/2012 | Hanson | 701/14 |
| 8,310,446 B1 * | 11/2012 | Owen et al. | 345/157 |
| 8,311,686 B2 * | 11/2012 | Herkes et al. | 701/3 |
| 8,380,366 B1 | 2/2013 | Schulte et al. | |
| 8,493,240 B1 | 7/2013 | Carrico | |
| 8,565,944 B1 * | 10/2013 | Gershzohn | 701/14 |
| 8,587,617 B2 | 11/2013 | Hoff et al. | |
| 8,829,401 B1 | 9/2014 | Lutke et al. | |
| D726,758 S | 4/2015 | Bourret | |
| 9,052,198 B2 | 6/2015 | Louise-Babando et al. | |
| 9,174,725 B2 | 11/2015 | Porez et al. | |
| 2003/0025719 A1 | 2/2003 | Palmer et al. | |
| 2003/0060940 A1 * | 3/2003 | Humbard et al. | 701/3 |
| 2003/0112503 A1 | 6/2003 | Lantin | |
| 2004/0006412 A1 | 1/2004 | Doose et al. | |
| 2004/0044446 A1 | 3/2004 | Staggs | |
| 2004/0056895 A1 | 3/2004 | Hedrick | |
| 2004/0225420 A1 | 11/2004 | Morizet | |
| 2004/0260458 A1 | 12/2004 | Park et al. | |
| 2005/0065671 A1 * | 3/2005 | Horvath et al. | 701/3 |
| 2005/0156777 A1 | 7/2005 | King et al. | |
| 2005/0203675 A1 | 9/2005 | Griffin et al. | |
| 2005/0222766 A1 | 10/2005 | Burch et al. | |
| 2005/0261808 A1 | 11/2005 | Artini et al. | |
| 2005/0273220 A1 * | 12/2005 | Humbard et al. | 701/3 |
| 2006/0132460 A1 | 6/2006 | Kolmykov-Zotov et al. | |
| 2006/0164261 A1 | 7/2006 | Stiffler | |
| 2007/0088492 A1 | 4/2007 | Bitar et al. | |
| 2007/0129855 A1 * | 6/2007 | Coulmeau | 701/3 |
| 2007/0182590 A1 * | 8/2007 | Younkin | 340/973 |
| 2007/0288129 A1 | 12/2007 | Komer et al. | |
| 2008/0046134 A1 * | 2/2008 | Bruce et al. | 701/1 |
| 2008/0243318 A1 * | 10/2008 | Ferro et al. | 701/11 |
| 2008/0249675 A1 | 10/2008 | Goodman et al. | |
| 2008/0300737 A1 * | 12/2008 | Sacle | G01C 21/00 701/3 |
| 2009/0070123 A1 * | 3/2009 | Wise et al. | 705/1 |
| 2009/0105890 A1 * | 4/2009 | Jones et al. | 701/1 |
| 2009/0118997 A1 | 5/2009 | Truitt | |
| 2009/0171560 A1 * | 7/2009 | McFerran | G08G 5/025 701/533 |
| 2009/0281684 A1 | 11/2009 | Spek | |
| 2010/0010958 A1 | 1/2010 | Perrow et al. | |
| 2010/0042316 A1 | 2/2010 | Caillaud | |
| 2010/0114633 A1 * | 5/2010 | Sislak | G06Q 10/047 701/120 |
| 2010/0156674 A1 | 6/2010 | Dwyer et al. | |
| 2010/0161157 A1 | 6/2010 | Guilley et al. | |
| 2010/0194601 A1 * | 8/2010 | Servantie | G08G 5/0021 340/971 |
| 2010/0194784 A1 | 8/2010 | Hoff et al. | |
| 2010/0305786 A1 * | 12/2010 | Boorman | 701/16 |
| 2010/0324807 A1 | 12/2010 | Doose et al. | |
| 2011/0001636 A1 | 1/2011 | Hedrick | |
| 2011/0029919 A1 | 2/2011 | Woltkamp | |
| 2011/0118908 A1 | 5/2011 | Boorman et al. | |
| 2011/0184595 A1 | 7/2011 | Albert | |
| 2011/0196599 A1 | 8/2011 | Feyereisen et al. | |
| 2011/0199239 A1 * | 8/2011 | Lutz | G01C 21/00 340/995.14 |
| 2011/0202272 A1 | 8/2011 | Feyereisen et al. | |
| 2011/0208374 A1 | 8/2011 | Jayathirtha et al. | |
| 2011/0213514 A1 | 9/2011 | Baxter | |
| 2011/0246015 A1 | 10/2011 | Cummings et al. | |
| 2011/0264312 A1 * | 10/2011 | Spinelli et al. | 701/16 |
| 2011/0313645 A1 | 12/2011 | Shukla | |
| 2012/0010765 A1 | 1/2012 | Wilson | |
| 2012/0105318 A1 * | 5/2012 | Nutaro | G06F 3/04815 345/157 |
| 2012/0116614 A1 * | 5/2012 | Torres et al. | 701/3 |
| 2012/0209458 A1 | 8/2012 | Sampath | |
| 2012/0215433 A1 * | 8/2012 | Subbu et al. | 701/120 |
| 2012/0253564 A1 * | 10/2012 | Noll et al. | 701/14 |
| 2013/0046462 A1 | 2/2013 | Feyereisen et al. | |
| 2013/0090841 A1 | 4/2013 | Barraci et al. | |
| 2013/0100042 A1 | 4/2013 | Kincaid | |
| 2013/0135202 A1 | 5/2013 | Louise-Babando | |
| 2013/0138275 A1 * | 5/2013 | Nauman | G08G 5/0021 701/16 |
| 2013/0179011 A1 * | 7/2013 | Colby et al. | 701/16 |
| 2013/0204524 A1 * | 8/2013 | Fryer et al. | 701/527 |
| 2013/0211635 A1 | 8/2013 | Bourret | |
| 2013/0215023 A1 | 8/2013 | Bourret | |
| 2013/0271300 A1 | 10/2013 | Pepitone et al. | |
| 2013/0278444 A1 | 10/2013 | Venkataswamy et al. | |
| 2014/0081569 A1 * | 3/2014 | Agrawal et al. | 701/467 |
| 2014/0200748 A1 | 7/2014 | Porez | |
| 2014/0277857 A1 | 9/2014 | Bourret et al. | |

FOREIGN PATENT DOCUMENTS

| | | | |
|---|---|---|---|
| EP | 2063227 A1 * | 5/2009 | G01C 23/00 |
| FR | 2 694 104 | 1/1994 | |
| FR | 2694104 A1 * | 1/1994 | G06F 3/02 |

OTHER PUBLICATIONS

French Search Report for FR 1350247 dated Nov. 22, 2013.
Restriction Requirement for U.S. Appl. No. 13/835,506 dated Mar. 27, 2014.
Restriction Requirement for U.S. Appl. No. 29/449,551 dated Apr. 9, 2014.
Non-Final Office Action for U.S. Appl. No. 13/687,729 dated Jul. 18, 2014.
Notice of Allowance for U.S. Appl. No. 29/449,551 dated Jul. 18, 2014.
Non-Final Office Action for U.S. Appl. No. 13/835,506 dated Jun. 26, 2014.
Non-Final Office Action for U.S. Appl. No. 13/835,201 dated Jun. 27, 2014.
Notice of Allowance for U.S. Appl. No. 13/905,914 dated Jul. 1, 2015.
Notice of Allowance for U.S. Appl. No. 13/835,201 dated Jul. 15, 2015.
Non-Final Office Action for U.S. Appl. No. 13/835,506 dated Jul. 28, 2015.
Notice of Allowance for U.S. Appl. No. 13/835,201 dated Oct. 28, 2015.

(56) References Cited

OTHER PUBLICATIONS

Interview Summary for U.S. Appl. No. 13/835,506 dated Oct. 29, 2015.
Non-Final Office Action for U.S. Appl. No. 13/834,401 dated Nov. 16, 2015.
Non-Final Office Action for U.S. Appl. No. 13/834,401 dated Sep. 2, 2014.
Notice of Allowance for U.S. Appl. No. 29/449,551 dated Oct. 22, 2014.
Interview Summary for U.S. Appl. No. 13/687,729 dated Oct. 27, 2014.
Final Office Action for U.S. Appl. No. 13/835,201 dated Nov. 19, 2014.
Final Office Action for U.S. Appl. No. 13/835,506 dated Nov. 14, 2014.
Extended European Search Report for Application No. EP 14 16 4240.5 dated Nov. 14, 2014.
Interview Summary for U.S. Appl. No. 13/834,401 dated Nov. 17, 2014.
Final Office Action for U.S. Appl. No. 13/834,401 dated Jan. 13, 2015.
Final Office Action for U.S. Appl. No. 13/687,729 dated Jan. 26, 2015.
Advisory Action for U.S. Appl. No. 13/835,506 Jan. 30, 2015.
Notice of Allowance for U.S. Appl. No. 13/687,729 dated Apr. 15, 2015.
Non-Final Office Action for U.S. Appl. No. 13/905,914 dated Mar. 26, 2015.
Non-Final Office Action for U.S. Appl. No. 13/835,201 dated Mar. 30, 2015.
Advisory Action for U.S. Appl. No. 13/834,401 dated Jun. 20, 2016.

* cited by examiner

AIRCRAFT FLIGHT MANAGEMENT DEVICES, SYSTEMS, COMPUTER READABLE MEDIA AND RELATED METHODS

BACKGROUND

The present subject matter relates generally to devices, systems, computer readable media, and related methods for aircraft flight management, and more particularly to a tactile user interface device providing centralized control over multiple aircraft flight management systems, for example, in the case of an abnormal event or failure which may require aircraft diversion.

During an aircraft flight, situations may arise that require the diversion of the aircraft and/or the execution of emergency procedures from flight crew operators. For example, where there is a fuel leak or an engine feed fault, flight crew operators, namely pilots, must make quick and informed decisions regarding whether to divert the aircraft to an available airfield and/or whether to rely on another appropriate response.

Currently, flight management controls, devices, and/or systems are provided throughout the cockpit in multiple different locations. This makes it difficult for crewmembers to quickly compile the necessary information and react for an aircraft flight reconfiguration or diversion while taking into account the systems information and/or controls necessary to perform any reconfiguration. Operators also lack the availability for long-range planning, diversion anticipation, and/or selection assistance during a flight.

Another problem with current flight management systems is that operators are generally limited on what information is quickly and immediately available to them during an abnormal event. Such information may include onboard notifications and alarms, printed or digital databases of available runway data, or communication with aircraft traffic control. This small amount of information may reduce the operators' abilities to anticipate possible diversions and determine the best possible flight reconfiguration based upon the emergency or abnormal event.

To date, there are no devices, systems, computer readable media, and/or related methods for assisting flight operators with the necessary guidance for flight management in the case of an abnormal event. Accordingly, there is a need for devices, systems, computer readable media, and related methods that will provide a centralized interface for operators to control flight management systems, especially in the case of abnormal events or failures. There is also a further need for systems and devices that offer extended capabilities for flight management during abnormal events, such as displaying a calculated available aircraft ranges and/or available airfield data. There is a further need for systems and devices that offers diversion anticipation and/or planning assistance such that operators are aware of the available diversions ahead of decision points.

SUMMARY

The subject matter described herein includes devices, systems, computer readable media, and/or related methods for providing aircraft flight management. In some aspects, the subject matter described herein includes devices, systems, computer readable media, and/or related methods for providing aircraft flight management during an abnormal event and/or in the event of a failure requiring diversion of the aircraft.

According to one aspect, a device for providing flight management (e.g., during an abnormal mission or abnormal event) may be provided. The device may comprise an interactive user interface and at least one map displayed on the user interface. The device may further comprise at least one diversion route and/or aircraft range overlaid on the map and information regarding one or more reachable airports overlaid on the map. Such information may assist aircraft operators with making quick and informed diversion decisions.

According to one aspect, a method for providing aircraft flight management during an abnormal event is provided. The method may occur, at least in part, at a computing platform including a processor and memory. The method may comprise exchanging data with one or multiple servers, calculating aircraft ranges using the data exchanged with multiple servers, displaying the aircraft ranges on a user interface, assisting with a selection of a diversion route using the displayed aircraft ranges, and building or otherwise electronically preparing the diversion route.

A system for providing aircraft flight management is also disclosed. The system may comprise a computing platform including a processor and memory. The computing platform may comprise a flight management application module (FMAM) configured to receive data from multiple servers and to calculate one or more aircraft ranges based upon the received data. The system may further comprise a user interface configured to display a map and one or more of the aircraft ranges overlaid on a portion of the map. In some aspects, the system may be configured to provide diversion assistance by selectively displaying information including the map, one or more of the aircraft ranges, a vertical display, and information regarding one or more reachable airports.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the terms "function", "application", and/or "module" refer to software in combination with hardware and/or firmware for implementing features described herein. In some embodiments, a module may include a field-programmable gateway array, an application-specific integrated circuit, or a processor.

BRIEF DESCRIPTION OF THE DRAWINGS

The subject matter described herein will now be explained with reference to the accompanying drawings of which.

DETAILED DESCRIPTION

Figure 1:
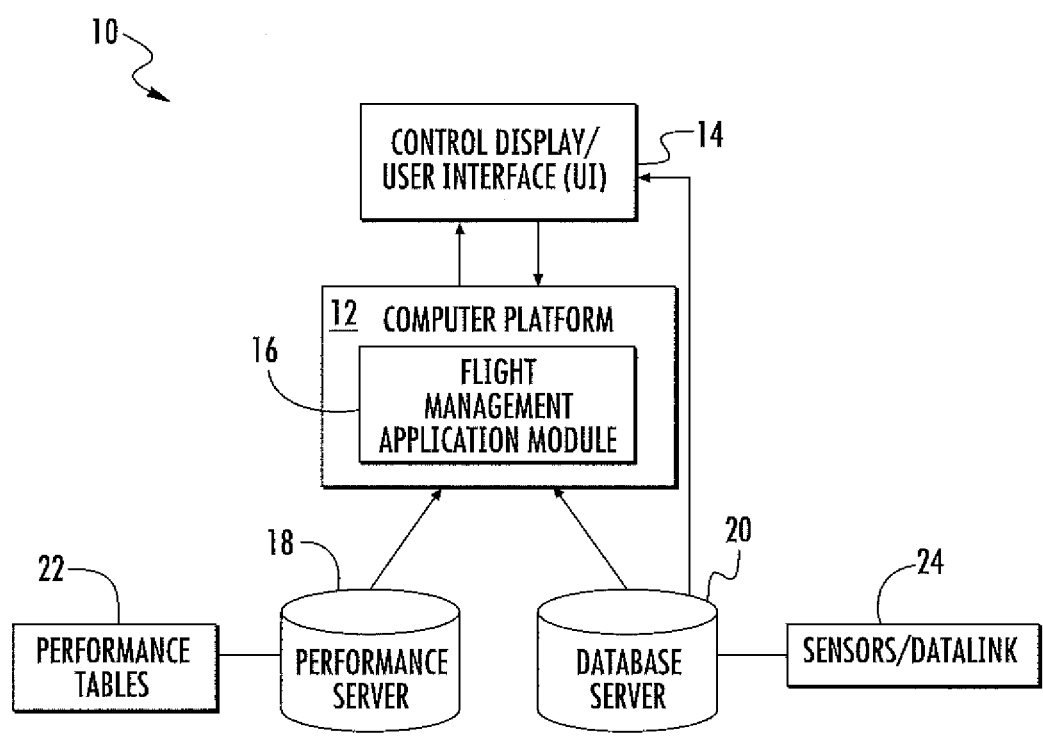
FIG. 1 is a diagram illustrating architecture of an exemplary system for providing fight management according to one aspect of the subject matter described herein.

The subject matter described herein discloses devices, systems, computer readable media, and related methods for providing aircraft flight management. Devices, systems, computer readable media, and/or related methods described herein may offer several features configured for supporting flight crew operators, especially in the case of abnormal events or failure requiring a diversion route. In some aspects, a device for providing flight management may include a tactile user interface that allows flight management and control thereof, such as allowing for aircraft diversion.

Notably, aspects of the subject matter described herein may be configured to provide a centralized flight management system allowing operators to make quick and well-informed decisions during an abnormal event or failure. In some aspects, systems described herein may be configured to provide "Abnormal Mission Management" (AMM). Aspects of the subject matter described herein may advantageously provide aircraft operators with interactive maps including information and several aircraft ranges corresponding to different aircraft configurations, accurate information on available airfields, help for diversion flight in case of failure, and/or simulation tools to play different failure scenarios for planning and anticipating diversions.

According to one aspect, an exemplary system for providing centralized aircraft flight management may comprise a computing platform and one or more flight management devices including an aircraft control display device or user interface. A computing platform may comprise any suitable entity configurable to provide aircraft flight management. In some aspects, the computing platform can be configured to provide flight management control prior to and/or during an event requiring aircraft diversion. In another aspect, the computing platform may comprise a memory and a processor for executing a module for managing and anticipating data regarding failure events on the mission and to anticipate problems. Furthermore, the computing platform may include a flight management application module (FMAM). The FMAM may include software executing on a processor for functions such as flight management, calculating aircraft ranges, providing diversion selection assistance, and/or diversion anticipation. For example, the FMAM may be configured to exchange data with one or more different interactive display devices in the cockpit and/or with multiple servers that store performance information and/or performance data associated with the aircraft. In addition, the FMAM may be configured to receive and/or exchange information with at least one performance server and at least one database server.

In some aspects, during abnormal events, the computing platform may be configured to include a FMAM and a user interface may exchange data with multiple servers. Such data can be calculated (e.g., at FMAM) and processed into aircraft ranges. Aircraft ranges and/or airport data (e.g., received from multiple servers) can be displayed, for example, on a tactile and interactive touch screen. Furthermore, multiple ranges and/or options for diversion routes can be displayed over maps and vertical profile areas of a user interface (UI). Airport information may also be displayed over portions of the UI and can assist with selection of a diversion route. Such information can assist operators with preparing for a diversion and/or assist with anticipation of a diversion.

In some aspects, the performance server may be configured to access, receive, store, and/or transmit data or information from one or more performance tables to FMAM. For example, the performance server may access and store information regarding the performance of the aircraft such as data obtained from one of performance tables such as engine operative performance tables, or performance downgrading coefficient tables. Furthermore, the performance server may be configured to transmit performance data or information to the FMAM such as fuel consumption, speed, flight level, landing performance, etc. Such data or information can be collected, monitored, computed into ranges, and transmitted to a user interface (UI) for display thereon.

In some aspects, the UI may be configured to visually display data obtained from FMAM and/or display action ranges calculated by FMAM. The UI may include a graphical user interface (GUI) configured to display a flight plan, maximum ranges, supplemental or contextual ranges, flight plan decision points, diversion routes, approach and landing performances, aircraft current position, heading, ground speed, aircraft anticipated position and predictions to aircraft operators. Furthermore, the UI may comprise a tactile and interactive user interface or screen, commonly referred to as a "touch screen". Upon making a diversion decision, operators may touch the UI to select options available thereon. Upon touching UI, one or more commands can be issued to FMAM. In addition, the UI may be configured to directly receive and display information from a database server. For example, the UI may receive and display one or combinations of one or more terrain maps, airports maps, navigation maps, wind maps, cloud maps, flight information region maps from the database server.

In some aspects, the database server may be configured to receive and store relevant data associated with the management of the mission, which may be updated by different aircraft sensors and/or datalinks communicating with ground entities. For example, the database server may receive and store information from sensors/datalinks such as airport databases, navigation databases, weather database, terrain databases, ATM area databases, and combinations thereof. Furthermore, the database server can store static or semi-static data associated with airports. For example, airport rescue, healing, and commercial data can be retrieved and stored at database server.

In some aspects, devices, systems, computer readable media, and/or related methods may provide diversion anticipation functions. That is, devices, systems, computer readable media, and/or related methods may, for example, provide flight crew with decision points and/or segments such that the crew is aware of diversion options with a "time to decision point" information along with the flight plan that delimit a diversion decision from another. The "time to decision point" may be set on the flight plan with a countdown for remaining time before taking the decision for diversion route.

In some aspects, devices, systems, computer readable media, and/or related methods may provide diversion selection assistance. That is, devices, systems, computer readable media, and/or related methods may alert operators via a notification to inform them about an event that could require a diversion (e.g., aircraft breakdown, fuel leak, etc.). Such information may be obtained from various sensors and/or detected by various aircraft functions. Notably, devices, systems, computer readable media, and/or related methods may provide operators with a list of diversion airports and runways. The diversion airports include reachable airports best suited for a diversion. The pilot may choose the best diversion airport and the diversion route may be built from various parameters.

In some aspects, devices, systems, computer readable media, and/or related methods may, for example and without limitation, provide at least four advantages including calculation and/or display of aircraft ranges, airfields display, diversion selection assistance, and/or diversion anticipation.

In some aspects, airfields display may comprise data or characteristics regarding airports included in the aircraft action ranges to improve diversion decision making during abnormal events or failures. Operators may selectively toggle between different displays by touching toggle buttons of the UI. The airfield display may also include maps and/or data regarding the reachable airports, determined by the current flight characteristics of the aircraft and its current location on a flight path. Furthermore, airfields display may also include details or information regarding mission airports. Mission airports may include airports involved in the current mission plans. According to one aspect, an airfields display may also provide airport data regarding both reachable airports and mission airports. Airport data may comprise information such as length of active runways, distance to reach the runway with a straight trajectory from the current aircraft location, or airport rescue, healing and commercial data in a standardized and comparable manner. In addition, the airfields display may be configured to display emergency landing sites which can be chosen from a database or estimated with an autonomous computation based upon terrain database or manually designated by the operator.

In some aspects, the UI may comprise a function or module configured to provide diversion selection assistance. Diversion selection assistance may comprise sending a notification to operators or crew via the UI about an event that could require a possible diversion. Diversion selection assistance may also include displaying a notification for diversion consideration, a diversion airports suggestion, and/or a diversion route(s) proposal. For example, an algorithm at FMAM for diversion airports filtering can be contextualized with the selected diversion event and can use various data such as a distance to the airport, approach, and landing performance, time to go, airport safety data and airport commercial data.

In some aspects, devices, systems, computer readable media, and/or related methods may selectively display one or more items of information including aircraft performance data, aircraft ranges, maps, airport information, tabulated airport information, runway display, reachable airports, mission airports, approach performance, landing performance, and/or flight plan decision points via user selection on the interactive screen.

As used herein, the terms "aircraft range(s)" or "action range(s)" refer to one or more maximum ranges and/or also one or more supplementary ranges applicable to a given diversion decision occurring after a specific abnormal event and/or failure. In some aspects, a maximum range includes consideration of inputs and calculation of one or more ranges (e.g., maps, distances, flight plan ranges) associated with maximum reachable airports. A display for such ranges may include a map of the reachable airports(s) with a fuel saving speed, a vertical profile, and a contextual flight level chosen amongst inputs. Maximum ranges may be calculated by considering available fuel (i.e., and margins thereof) wind, terrain, aircraft capabilities and assuming optimal speed, lateral profile, and vertical profile.

In some aspects, supplementary ranges may complement maximum range for use during a diversion decision. In some aspects, supplementary ranges may include one or more ranges including an engine relight range for dual engines failure, a pessimistic range for evolving failures (e.g., fuel leak, jammed flight control surface), and iso-time ranges useful when a time to land becomes critical. The engine relights range may be applicable to dual engine aircraft having dual engine failure and assumes a glide descent at windmilling speed. Pessimistic ranges indicate evolving failures and include ranges according to worse conditions, for example, in case of a fuel leak; the range may be calculated and displayed as if the fuel tank were empty. Iso-time ranges indicate when time to land becomes critical and may be used, for example, in case of a sick/undisciplined passenger, flight/cabin crew incapacitation, a bomb on board, a hijack, or other event.

As used herein, the term "touch screen" refers to a user interface and/or display screen upon which the user (i.e., flight crew or aircraft operator(s)) select options (e.g., from a menu, toggle buttons, tabs, etc.) by physically touching portions of the screen.

As used herein, failures or abnormal events that may prompt a diversion include one and/or a combination of two or more of the following: a major power fault (i.e., electrics or hydraulics in emergency configuration); excessive cabin altitude or depressurization; smoke/fumes; fire; fuel leak; engine feed fault; tail strike; one engine out during initial climb or in cruise; all engines out; fuel over consumption; landing gear not retracted; safety procedure imposing a low ceiling (e.g., depressurization, engine out); fuel trapped; airspace closure; aircraft failures downgrading its approach capability (e.g., radio altimeter fault); aircraft failures increasing the landing distance (e.g., ground spoilers fault); inclement weather; approach minima downgraded due to weather; runway condition (e.g., due to weather); unusable landing runway (e.g., closed, under construction, in maintenance, contaminated); destination airport not available (e.g., night closure); aircraft failures making the aircraft unable to dispatch from planned destination; passenger comfort/convenience impacting failures (e.g., galley failure, lavatory failure); total display loss; total communication loss; Required Navigation Performance (RNP) and/or Reduced Vertical Separation Minimum (RVSM) capability loss; flight crew incapacitation; sick/undisciplined passenger (s); safety/threat on board; bomb on board; volcanic ash encounter; hijack; cabin crew incapacitation; and/or any other imaginable catastrophic or abnormal event. As used herein, the terms "function", "application", and/or "module"

refer to software in combination with hardware and/or firmware for implementing features described herein. In some embodiments, a module may include a field-programmable gateway array, an application-specific integrated circuit, or a processor.

Referring now to the drawings which, without limitation, show possible configurations and arrangements for the subject matter disclosed herein, FIG. 1 is a diagram illustrating an exemplary system 10 for providing aircraft flight management according to one aspect of the subject matter described herein. System 10 may comprise a computing platform 12 and one or more flight management devices including an aircraft control display device or user interface (UI) 14. Computing platform 12 may comprise any suitable entity (e.g., a computer, a computer operating system, a server, etc.) configurable to provide aircraft flight management, for example, to provide process, calculate, and/or display information needed during an abnormal event or failure. In some aspects, computing platform 12 may be configured to provide flight management control prior to and/or during an event requiring aircraft diversion. In some aspects, computing platform 12 may comprise a memory and a processor for executing a module (e.g., an application, function, or other software) for managing and anticipating data regarding failure events on the mission and to anticipate problems.

Figure 2:
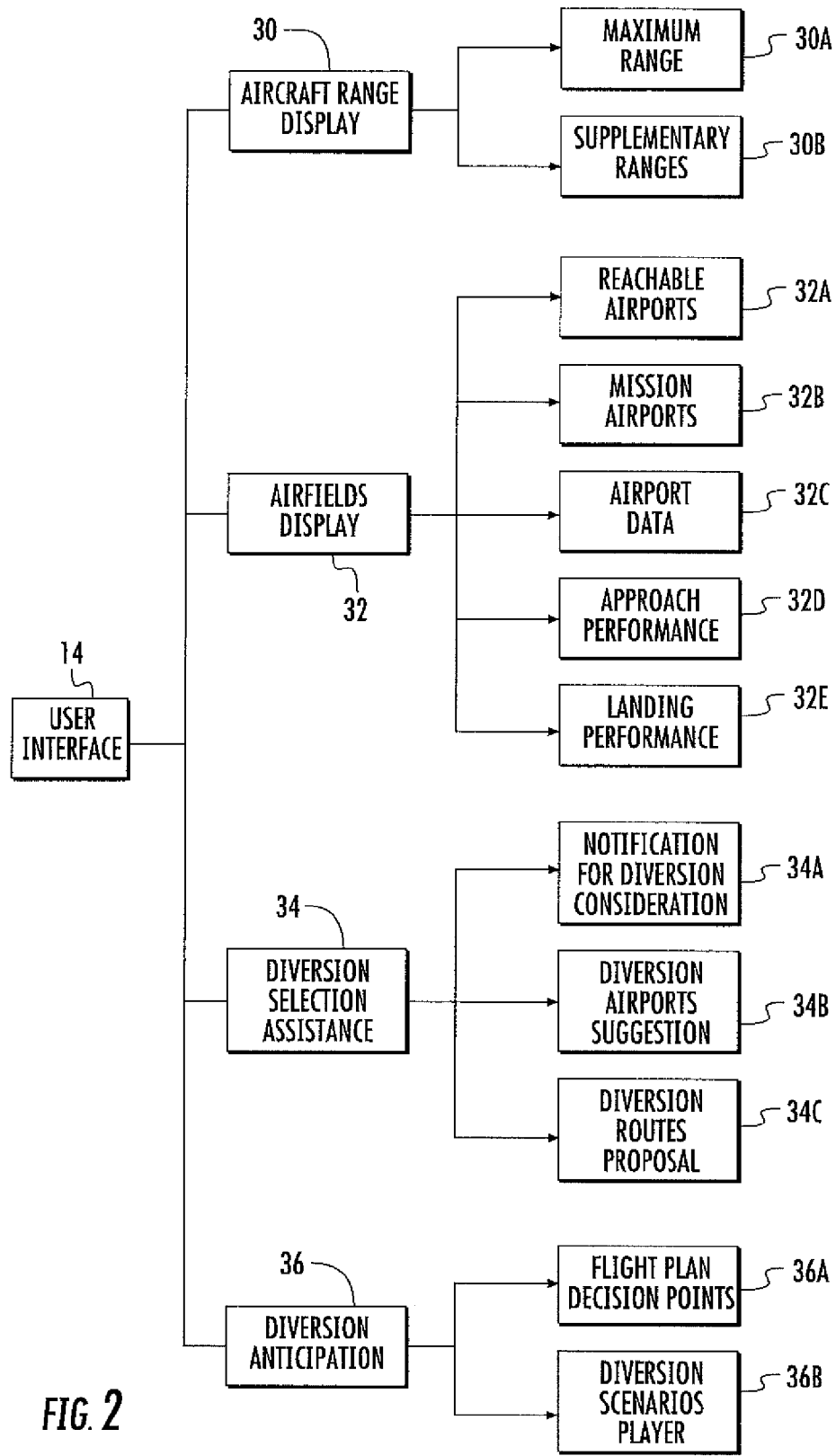
FIG. 2 is a diagram illustrating a functional tree for providing flight management via a flight management device according to one aspect of the subject matter described herein.

In some aspects, computing platform 12 may comprise a flight management application module (FMAM) 16. FMAM 16 may comprise any suitable entity (e.g., software executing on a processor) for providing flight management, calculating aircraft ranges, providing diversion selection assistance (FIG. 2), and/or diversion anticipation (FIG. 2). In some aspects, FMAM 16 may be configured to exchange data with one or more different interactive display devices in the cockpit and/or with multiple servers that store performance information and/or performance data associated with the aircraft. In some aspects, FMAM 16 may be configured to receive and/or exchange information with at least one performance server 18 and at least one database server 20.

In some aspects, performance server 18 may be configured to access, receive, store, and/or transmit data or information from one or more performance tables 22 to FMAM 16. In some aspects, performance server 18 may access and receive performance impacting failure data associated with the in-flight performance. That is, performance server 18 may access and store information regarding the performance of the aircraft such as data obtained from one or performance tables 22 including engine operative performance table(s), engine out performance table(s), all engines out performance table(s), performance downgrading coefficient table(s), etc. In some aspects, performance server 18 may transmit performance data or information (e.g., in-flight performance data) to FMAM 16 such as, for example, fuel consumption, speed, flight level, landing performance, etc. Such data or information may be collected, monitored, computed into ranges, and transmitted to UI 14 for display thereon.

UI 14 may visually display data obtained from FMAM 16 and/or display action ranges calculated by FMAM 16. UI 14 may also be configured to display information directly obtained from database server 20, such as map data, terrain data, wind data, and/or airfield or airport data. In some aspects, UI 14 may comprise a graphical user interface (GUI) configured to display a flight plan, maximum range(s), supplemental or contextual range(s), flight plan decision points, diversion routes, approach and landing performance (s), aircraft current position, heading, ground speed, aircraft anticipated position and predictions to aircraft operators.

In some aspects, database server 20 may be configured to receive and store relevant data associated with the management of the mission, which may be updated by different aircraft sensors and/or datalinks communicating with ground entities. That is, database server 20 may receive and store information from sensors/datalinks 24. In some aspects, sensors/datalinks 24 include one or more airport databases, navigation databases (e.g., waypoints, airways, navaids, etc.), weather databases, terrain databases, ATM area databases, and combinations thereof. Any sensor/datalink may be configured to provide information to database server 20.

In some aspects, database server 20 may store static or semi-static data associated with airports. Such airports may be, but do not have to be associated or with the instant mission. For example, airport rescue, healing, and commercial data may be retrieved and stored at database server 20. In other aspects, dynamic data for aircraft landing such as reachable airports, predictions attached to airports, approach performance, and landing performance may be calculated by FMAM 16 using data transmitted by and/or stored at performance server 18.

In some aspects, database server 20 may be configured to transmit data or information to FMAM 16 for use in range calculation and/or for displaying at UI 14. In some aspects, UI 14 may display maps that are overlaid with information relating to aircraft performance and/or airport information. In some aspects, database server 20 may be configured to send weather information (e.g., winds aloft, surface wind), terrain data, and minimum en route altitude (MEA) and minimum off-route altitude (MORA) information, and closed airspace information for display at UI 14. FMAM 16 may use such information for calculating aircraft ranges, including maximum and supplementary ranges for use in making diversion decisions.

Notably, UI 14 may be configured to directly receive and display information from database server 20. In some aspects, UI 14 may receive and display one or combinations of one or more terrain maps, airport(s) maps, navigation maps, wind maps, cloud maps, flight information region (FIR) maps, etc.

In some aspects, UI 14 may comprise a tactile and interactive user interface or screen, commonly referred to as a "touch screen". Upon making a diversion decision, operators may touch UI 14 to select options available thereon. Upon touching UI 14, one or more commands may be issued to FMAM 16. That is, operators may select an airport/runway destination, select a desired diversion route, send a route building command, send a diversion route insertion command, and/or send a ghost aircraft move command.

In some aspects, FMAM 16 may comprise an application that uses flight (e.g., performance) information in addition to other information available from various databases (e.g., airports, navigation, and weather databases to name a few) for providing improved flight management control by interacting with users (e.g., flight crew and/or aircraft operators) to promote rapid but informed diversion decisions. System 10 may further provide the flight crew with decisions points such that the crew is aware of diversion options/information and help with anticipating abnormal events.

FIG. 2 is a diagram of a functional tree for providing flight management, especially abnormal mission management (AMM) via UI 14. As described in FIG. 1, system 10 may comprise FMAM 16 and a flight management device, such as a graphical user interface (GUI) or tactile display screen (i.e., UI 14). UI 14 may communicate with FMAM 16 and display information derived at and/or sent via FMAM 16. UI 14 may also display information stored at and/or sent via database server 20, including mapped data and airport data. In some aspects, system 10 comprises centralized flight management control including AMM provided via UI 14 and FMAM 16. UI 14 functionality, as illustrated in FIG. 2, may allow operators to make quick and well-informed decisions by viewing various types of information in a centralized location (e.g., at UI 14) during an abnormal event or failure.

In some aspects, UI 14 may provide flight management in case of failure events by simultaneously displaying various types of different information, indication, and dedicated controls, either automatically or on request, and available via a touch screen. In some aspects, UI 14 may comprise one or more characteristic functions or modules displayed via execution of commands at computing platform 12 (FIG. 1). In some aspects, UI 14 may comprise four characteristic functions or modules that enable centralized flight management. Such functions or modules may advantageously assist in providing flight management during an abnormal mission. Such functions and modules comprise AMM functionality, and may be provided via communication received from and/or calculations performed at FMAM 16 and displayed via UI 14. In some aspects, UI 14 may provide an aircraft range display 30, an airfields display 32, diversion selection assistance 34, and diversion anticipation 36. In some aspects, FMAM 16 and UI 14 of system 10 may collectively calculate and display aircraft ranges, airfield information, provide diversion selection assistance and diversion anticipation.

In some aspects, aircraft range display 30 may be configured to display various different and/or various possible aircraft ranges useful in emergency situations or extenuating circumstances that may require flight reconfiguration, diversion, and/or adjusted range options. For example, aircraft range display 30 may comprise one or more maximum ranges 30A and/or one or more supplementary ranges 30B. Aircraft range display 30 may display 360° (e.g., circled, see 62 FIG. 3) maximum ranges calculated based upon available fuel and/or margins thereof, wind, terrain, aircraft capabilities, and assuming optimal speed, lateral and vertical profiles. In some aspects, FMAM 16 (FIG. 1) of system 10 may be configured to calculate maximum and supplementary ranges 30A and 30B, respectively, based upon inputs including in-flight performance data (e.g., fuel level, available fuel, weight, actual time) available from performance server 20 (FIG. 1). In some aspects, FMAM 16 (FIG. 1) of system 10 may be configured to calculate maximum and supplementary ranges 30A and 30B, respectively, based upon inputs including information (e.g. wind data, terrain data) from one or more databases (e.g., database server 22) which may be updated by sensors and/or datalinks to ground entities. In some aspects, UI 14 may receive ranges from FMAM 16 (FIG. 1) and communicate and display aircraft ranges and data to operators. In some aspects, UI 14 communicates and displays aircraft ranges and data via one or more maps or other graphical output.

In some aspects, each aircraft range may be visually displayed on UI 14 in different and/or specific colors (not shown) to be differentiated or distinguished on a same map. Notably, multiple aircraft ranges (e.g., including various maximum and supplementary ranges) may be displayed on UI 14 together to assist aircraft operators in making informed decisions regarding diversion and available resources during an abnormal event. In some aspects, aircraft action ranges may be calculated using inputs including operational capabilities (e.g., weight, available fuel, time); information regarding aircraft performance (i.e., available from performance server 18); information regarding exterior/ground conditions (i.e., information available from database server 20 such as wind aloft and surface wind); degraded aircraft performance factors available via sensors (e.g., fuel overconsumption, fuel leaks, jammed/locked flight control surfaces, landing gear failure), and unavailable air blocks (e.g., closed airspaces by air traffic control (ATC) directive, unauthorized airspaces, obstacle areas, etc., also available via database server 20). Such inputs may be stored in FMAM 16 (FIG. 1), database server 20 (FIG. 1), and performance server 18 (FIG. 1) and may be automatically updated and displayed via UI 14. However, operators may also update data manually via a manual request, for example, by touching an icon or portion of the interactive display on UI 14.

In some aspects, maximum ranges 30A may comprise information regarding reachable airports calculated from different flight levels and the vertical profile. Maximum ranges 30A may comprise ranges determined using information including but not limited to, the aircraft cruise level, optimal vertical level, or an imposed ceiling level. For example, in some aspects maximum ranges may include a cruise level maximum range, an optimal level maximum range, an imposed ceiling maximum range, and a glide maximum range. The cruise level maximum range corresponds to and/or indicates the maximum reachable distance if cruise level is maintained. The cruise level range may be determined using a standard climb/descent profile, and then maintaining that altitude $M_{LRC}$ (where LRC=long range cruise Mach) on each azimuth, until the final descent. The optimal level maximum range indicates the maximum reachable distance if optimal level is joined; the aircraft joins the computed optimal flight level using a standard climb/descent profile, and then maintains the altitude of $M_{LRC}$ on each azimuth, until the final descent. The imposed ceiling maximum range indicates the maximum reachable distance if ceiling is joined, and upon an immediate descent to the ceiling using the appropriate speed, then a level flight at the ceiling altitude is maintained and a final descent using a standard profile. A glide maximum range indicates a range for the situation when the main systems in the aircraft are out of order and when a minimum descent rate needs to be assumed to avoid engine stall. The calculated aircraft action range calculates ranges (e.g., regarding available airports and/or landing areas) for a continuous glide descent at the best lift-to-drag ratio speed.

Figure 3:
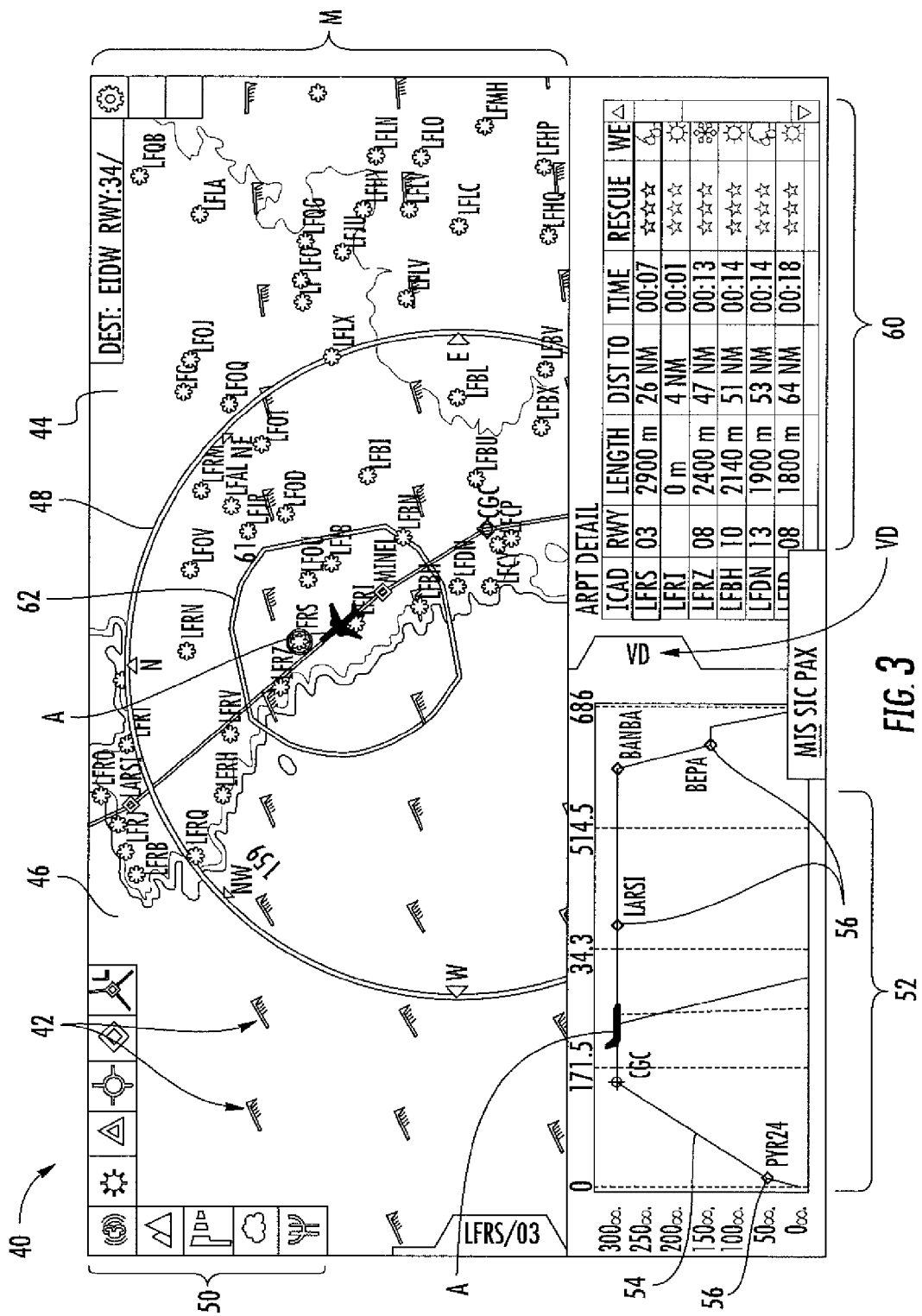
FIG. 3 is a diagram illustrating an exemplary user interface for providing flight management according to one aspect of the subject matter described herein.

In some aspects, supplementary ranges 30B, may include ranges determined by engine relights, pessimistic ranges from evolving failures, or iso-time ranges such as a minimum time range (see e.g., 62 FIG. 3). Each action range may be displayed with a specific color code to be distinguished on the map appearing displayed via UI 14. In some aspects, pessimistic ranges include ranges calculated based upon evolving failures (e.g., fuel leak, jammed landing equipment) at the worse condition. For example, in the case of a fuel leak failure, the ranges (e.g., reachable distances and/or airports) are calculated as if the identified leaking tank were empty. Iso-time ranges are calculated and displayed and indicate the most appropriate airports for quick landing, in case of, for example, a hijack, sick/undisciplined passenger, flight/cabin being incapacitated.

Still referring to FIG. 2, UI 14 may further provide an airfields display 32 for displaying to operators. In some aspects, airfields display 32 comprises data or characteristics regarding airports included in the aircraft action ranges (e.g., maximum/supplementary ranges) to improve diversion decision making during abnormal events or failures. In some aspects, UI 14 may be configured to display aircraft ranges and airfield information on a single screen, wherein the ranges are adjacent each other and/or visually distinguishable. In some aspects, operators may selectively toggle between different displays by touching toggle buttons of UI 14 (e.g., 50, FIG. 3). Airfields display 32 may include maps and/or data regarding the reachable airports 32A, determined by the current flight characteristics of the aircraft and its current location on a flight path. In some aspects, reachable airports may be highlighted on a visual map within the maximum range. In some aspects, UI 14 displays reachable diversion airports inside the action range using graphics on the map or in a list available on a user interface or display screen (see e.g., FIGS. 3-4).

Airfields display 32 may also include details or information regarding mission airports 32B. Mission airports 32B include airports involved in the current mission plans. In some aspects, data highlighting and differentiating the characteristic airports may be displayed, and obstacle escape airports, departure, destination, and/or alternate airports may be displayed.

In some aspects, airfields display 32 may provide airport data 32C regarding both reachable airports 32A and mission airports 32B. Airport data 32C may comprise information regarding active runways, the length of the active runways, distance to reach the runway with a straight trajectory from the current aircraft location, distance to reach the runway with a straight trajectory and a vertical flight path optimized for a given failure event, the time to land from current aircraft location with a straight trajectory from the current aircraft location, combinations thereof, and/or other characteristics such as meteorological conditions and fire/rescue support capability at the airport. In some aspects, airport data 32C comprises a display of the airport rescue, healing, and commercial data in a standardized and comparable manner.

In some aspects, airfields display 32 may further provide an approach performance 32D as well as landing performance 32E associated with the airports available to the aircraft. Approach performance 32D and landing performance 32E may comprise data regarding the available runway approach and landing characteristics of the aircraft and/or airports based on the inputs from the performance server 18 and database server 20 (FIG. 1). In some aspects, approach performance 32D may comprise runway approach categories and associated minima, together with the aircraft and flight crew approach capability and forecasted weather. Landing performance 32E may indicate landing performance on the airport runways and the forecasted runway condition. In some aspects, approach performance 32D and landing performance 32E require dynamic data for aircraft landing. In some aspects, dynamic data including reachable airports, predictions attached to airports, approach performance, and landing performance may be calculated by FMAM (16, FIG. 1) from data available in performance server (18, FIG. 1). Notably, UI 14 may displays, and FMAM 16 (FIG. 1) may calculates approach and landing performances 32D and 32E, respectively, for each reachable runway according to weather conditions on the approach path.

In some aspects, UI 14 may further provide approach and landing performances for each reachable runway of the selected airport according to the weather conditions on the approach path. In order to calculate the approach performance 32D, FMAM 16 (FIG. 1) may combine aircraft approach capabilities such as instrument capabilities onboard, airport approach means, and/or crew approach qualification. In some aspects, landing performance 32E may be defined in two steps, (i) a preliminary landing performance or landing weight on the runway, and (ii) a detailed landing performance. In some aspects, the preliminary landing performance may be computed via FMAM 16 (FIG. 1) assuming a direct flight to the runway using the maximum range profile down to the runway threshold, aircraft failures and fuel levels. In some aspects, detailed landing performance or an accurate landing weight according to the selected runway may be determined at FMAM 16 according to aircraft failures impacting landing performance and forecasted surface wind and the runway condition forecast.

In some aspects, airfields display 32A may be configured to display emergency landing sites which may be chosen from a database or estimated with an autonomous computation based upon terrain database or manually designated by the operators. Such emergency landing sites may be automatically sorted according to safety criteria to maximize passenger and crew survival. In some aspects, emergency landing sites may be overlaid on UI 14 via VFR (visual flight rules) map overlaid when no commercial airport is reachable.

Still referring to FIG. 2 and in some aspects, UI 14 may comprise a function or module configured to provide diversion selection assistance 34. Diversion selection assistance 34 may comprise sending a notification to operators or crew via UI 14 about an event that could require a possible diversion. For example, information detected by FMAM 16 (e.g., via sensors/datalinks 24) such as an aircraft breakdown, external failures/events, or events activated by the crew (e.g., "MIS SICK PAX" on FIG. 3 indicates a sick passenger) may be displayed at UI 14 for notifying and alerting the operators in the cockpit about the event or failure. Diversion selection assistance 34 may also provide guidance for managing the diversion. If known, the root cause event that changed flight assumptions may be indicated.

In some aspects, diversion selection assistance 34 may include displaying a notification for diversion consideration 34A, a diversion airports suggestion 34B, and/or a diversion route(s) proposal 34C. Notification for diversion consideration 34A may comprise a notification to the crew or aircraft operators for an event and a display of main operation consequences. Diversion airports suggestion 34B may comprise displaying a selection of airports best suited for diversion according to safety, regulations, performance, and/or other commercial criteria. That is, in some aspects, diversion selection assistance 34 may provide a list of suggested airports ranked in an order from the most suited to the least suited to handle the diversion and/or abnormal event. In some aspects, diversion selection assistance 34 may propose several feasible diversion routes to the selected airfields, either on crew request or automatically. The aircraft operator(s) or pilot(s) may ultimately choose the best diversion airport according to his own experience.

In some aspects, an algorithm at FMAM 16 (FIG. 1) for diversion airports filtering may be contextualized with the selected diversion event and may use various data such as a distance to the airport, approach, and landing performance, time to go, airport safety data and airport commercial data. The function or algorithm may sort the diversion airports according to one main decision parameter/criterion. For example, when fuel/range is the main concern or decision parameter, the distance to each diversion airport may be explicitly indicated. Thus, when time is the main decision parameter, the landing estimated time of arrival (ETA) may be explicitly indicated.

The algorithm for diversion airports comparison may be contextualized with the selected diversion event, and may indicate data such as airport distance, runway length, airport weather, and landing time. When there is only one available diversion airport or when the comparison identified only one available airport, UI 14 may provide the crew with only one diversion route as directed by and processed at FMAM (16, FIG. 1). When the comparison algorithm at may not identify the best diversion airport, FMAM (16, FIG. 1) provides the crew with three (maximum) diversion routes so that the pilot may choose the best one according to his/her own experience.

Suggestions for diversions available to the aircraft may be determined at FMAM 16 (FIG. 1) and visually displayed at UI 14. Such suggestions may be displayed on UI 14 in different colors (e.g., suggested airports, routes, etc.). In some aspects, diversion routes proposal 34C may provide and display routes built from various parameters such as a speed profile, a lateral profile, and a vertical profile. Diversion routes proposal 34C may also take into account the specific constraints of the flight, such as extended operations (ETOPS), vertical obstacles, or closed airspaces. In some aspects, a chosen diversion route of multiple routes (100, 102, FIG. 5A) may be validated by the operator, who may manually modify the trajectory by touching UI 14, which is comprised of a tactile touch screen. For example, a diversion route built from one or more pilot requests and/or a diversion route proposed automatically by FMAM 16 may be displayed on the map as an alternative trajectory which forks from the flight plan at a given point. The aircraft operator can perform direct interaction with this diversion route object, such as accept, reject, and/or modify the diversion route, or insert the diversion route as the new active flight plan. After validation by the operator, the validated route may be indicated by a color change, and the route may be built using data obtained at FMAM 16 (FIG. 1).

In some aspects, UI 14 may further comprise a function or module configured for diversion anticipation 36. Diversion anticipation 36 may comprise providing the operators with multiple decision nodes or segments (see e.g., 128, FIG. 6) Such decision points or segments may delimit one diversion decision from another, and offer a "time to decision point" as a countdown for remaining time before accepting the decisions for a diversion route. Diversion anticipation 36 may comprise offering flight plan decision points 36A. Decision points 36A may be manual, prepared, or computed. Manual decision points may be directly inserted by the crew or operator. Prepared decision points may be loaded with the flight plan during mission preparation, and computed decision points may be automatically inserted via FMAM 16 (FIG. 1) upon a diversion event triggering a necessary response.

In some aspects, UI 14 offers diversion scenarios via a diversion scenario player 36B in order to anticipate abnormal events, while also allowing the flight crew to simulate diversion-prone events at any point downstream of the current flight plan. Such scenarios may be played through a ghost aircraft (e.g., see FIG. 4) moving along the flight plan. In some aspects, ranges and diversion routes may be associated with the ghost aircraft position. One or several diversion events may be simulated at the ghost aircraft position. In some aspects, diversions scenarios player 36B may allow playing diversion scenarios at any point downstream of the flight trajectory or flight plan.

In some aspects, each diversion scenario may be composed of (i) a flight plan segment and associated diversion airports(s); (ii) one or several diversion routes to the diversion airport(s); and (iii) a list of abnormal events associated with the scenario. In the situation matches a diversion scenario, then it is activated to be assessed by the crew with the updated elements (e.g., wind, weather, etc.). If not diversion scenario matches the situation that still requires a diversion, or if the prepared diversion scenario is no more relevant, then the system (10, FIG. 1) may provide a dynamically computed diversion solution only if the aircraft is in a computed diversion segment. For example, the computed diversion segment may begin at the aircraft's present position and end at a decision point downstream in the flight plan. FMAM (16, FIG. 1) can then find an adequate diversion airport once a decision point has been computed.

FIG. 3 illustrates a screen shot of an aircraft operator UI, generally designated 40. In some aspects, UI 40 may be similar in form and function to UI 14, as previously described. In some aspects, UI 40 may comprise a tactile touch screen allowing operator(s) to interact with the UI and computing platform 12 (FIG. 1) including modules for selecting and displaying various types of information to assist in diversion decision making. In some aspects, UI 14 may comprise a map M depicting location and/or terrain. In some aspects, map M includes details on airports, weather conditions, flight over area, etc. A flight icon A represents the aircraft and the current route of the aircraft. Map M may also include several action ranges. In some aspects, information sent via FMAM 16 (FIG. 1) and database server 20 (FIG. 1) may be displayed via UI 40. In some aspects, UI 40 allows operators to display current aircraft performances near aircraft icon A via touching icon A (e.g., via a command or request from the pilot). By physically touching aircraft icon A, a host aircraft may be displayed and moved to a future point on the forecasted runway, and UI 40 may provide visual data (e.g., communicated via FMAM 16 or database server 20, FIG. 1) associated with forecasted aircraft performances (e.g., fuel, weight) and the forecasted action ranges at the selected future point.

In some aspects, UI 40 may comprise graphical indicators for meteorological conditions such as wind velocities and directions 42, graphical representations of airports and/or runways in the vicinity of the flight path (e.g., LFRS, LFRI, etc., airports and/or runways may be denoted by abbreviations in all capital letters etc.), and graphical representations of the geographical flyover data, such as land 44, bodies of water 46, and directional indicia such as a compass 48. Such graphical representations may be displayed within individual layers and may be tied to specific data available from FMAM 16 (FIG. 1) and database server 20 (FIG. 1). Such layers may be activated or deactivated visually by the operator selecting and touching toggle buttons 50 available on UI 40.

In some aspects, UI 40 may be configured to display a vertical display 52 overlaid adjacent to and/or below portions of interactive map M. Vertical display 52 may provide details and information regarding the vertical characteristics of the current flight path 54. Vertical display 52 may be opened or closed on the display through an interactive tab control VD, whereby the operator may select the tab VD to view vertical display 52, or select the tab VD to hide vertical display 52 as desired and/or required.

In some aspects, vertical display 52 may indicate waypoints 56. Waypoints 56 may correspond to locations or changes of course on the calculated flight plan 54 of the aircraft. In some aspects, vertical display 52 may include a dynamic aircraft icon A, which indicates the current position of the aircraft along the predetermined flight path 54.

Notably, UI 40 may further comprise an airport display 60. Airport display 60 may comprise details regarding reachable airports and/or airports geographically represented on map M. In some aspects, airport display 60 may comprise an airfields display 32, as described in FIG. 2. Airport information may be tabularized and organized by airports or runways (denoted by abbreviations LFRS, LFRI, etc.) within range of the aircraft and/or as they occur along flight path 54. Airport display 60 may be opened or closed on the display screen via interactive toggle buttons 50 or tab control. In some aspects, display 60 may comprise a table of characteristics of each indicated airport. For example and in some aspects, display 60 may comprise a table displaying at least one active runway name, runway number, runway length, distance to reach the runway with a straight trajectory from the current aircraft location, distance to reach the runway with a straight trajectory and a vertical flight path optimized for a given failure event, the time to land from current aircraft location with a straight trajectory from the current aircraft location, or other local characteristics such as meteorological conditions and fire/rescue support capability at the airport.

In some aspects, representations of airports in the vicinity of the flight path may be highlighted on the map via star shapes or any other symbol(s) or identifier(s) capable of presenting runway properties such as orientations. (e.g., adjacent each four letter abbreviation). Information associated with airports in display 60 may include departure, arrival, and alternate airports (e.g., in case of inclement weather or closings). ETOPS segments diversion airports may be illustrated and/or tabulated and obstacle segments diversion airports (e.g., flight over mountains) and reachable through escape routes defined by the airlines may also be displayed.

In some aspects, UI 40 may further comprise one or more aircraft ranges such as, for example and without limitation, a minimum time range 62. In some aspects, minimum time range 62 may be indicated as an isometric line about the dynamic aircraft icon A. In some aspects, minimum time range 62 may comprise a time range defined by a continuous descent vertical profile at maximum speed and maximum rate of descent, calculated at FMAM (16, FIG. 1) based upon inputs available at servers, and displayed at UI 40 in response to a failure event such as engine loss or fuel loss. In some aspects, minimum time range 62 may comprise a supplementary range (e.g., an iso-time range) indicating a situation where the time to land becomes critical and/or of upmost importance for the aircraft to perform a quick landing. This may occur in case of, for example, a sick or undisciplined passenger, flight/cabin crew incapacitation, a bomb on board, or a hijacking.

Maximum ranges 30A (e.g., FIG. 2) regarding reachable airports and/or maximum distances obtainable at aircraft condition (see FIG. 5A) and supplementary ranges 30B (FIG. 2) may be displayed on UI 40. Maximum ranges 30A may display calculated ranges derived at FMAM (16, FIG. 1) regarding possible ranges to the nearest airports with a fuel-saving aircraft speed, a vertical aircraft flight profile, and a contextual flight level chosen amongst the flight plan cruise level, the optimal level, or the imposed ceiling. Supplementary ranges 30B (FIG. 2) may comprise engine relights range for dual engines failures, pessimistic ranges for evolving failures such as fuel leaks or jammed control surfaces, or iso-time ranges such as the minimum time range 62.

Figure 4:
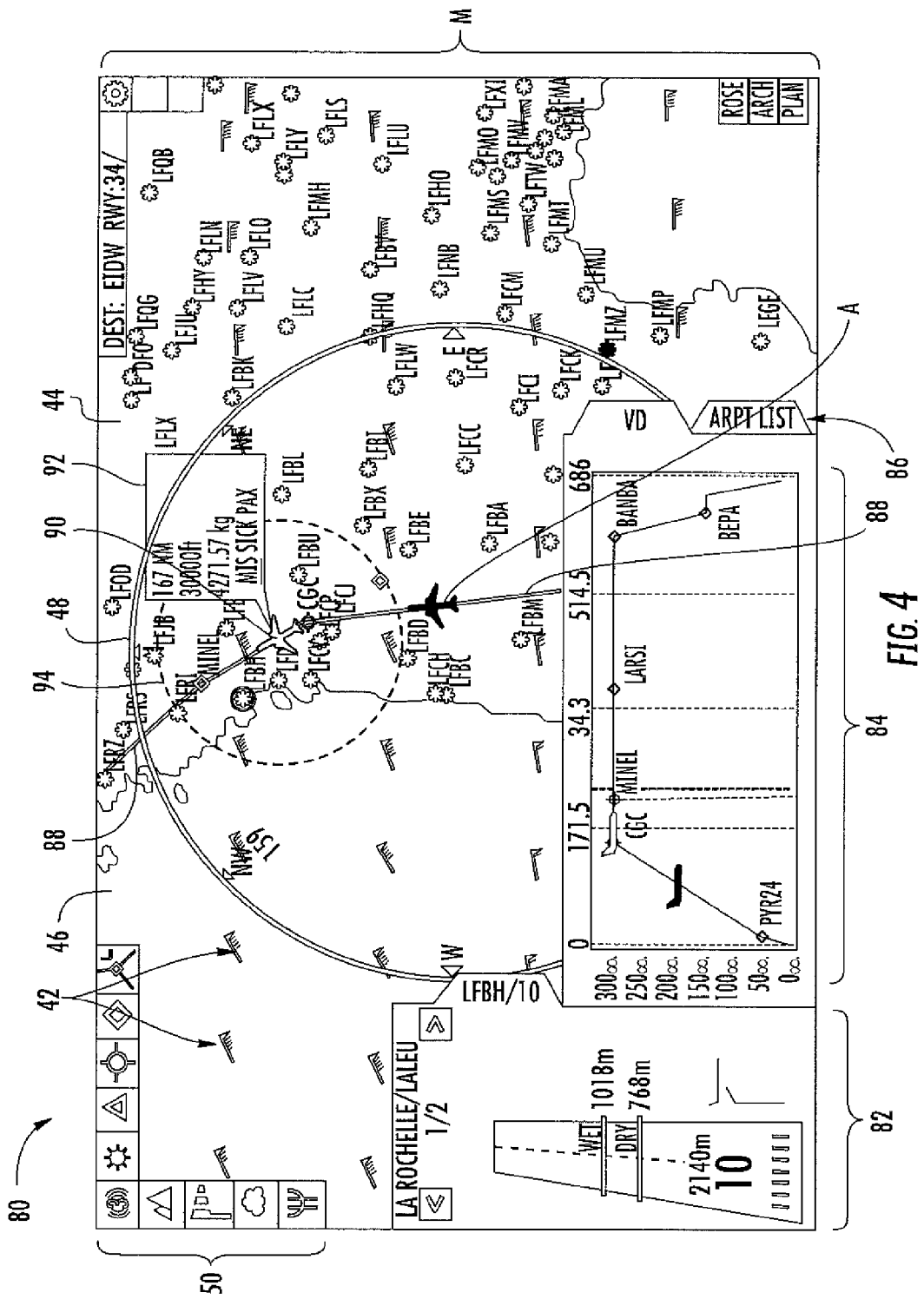
FIG. 4 is a diagram illustrating another exemplary user interface for providing flight management according to one aspect of the subject matter described herein.

Referring now to FIG. 4, another exemplary operator UI, generally designated 80 is shown. In some aspects, UI 80 a geographic map M having interactive features or layers thereby providing the operator flight management controls for aircraft response to emergency situations and diversion assistance. In some aspects as described in FIG. 3, UI 80 may comprise graphical indicators for meteorological conditions such as wind velocities and directions 42, graphical representations of airports or runways in the vicinity of the flight path (e.g., denoted by four letter abbreviations), graphical representations of geographical flyover data such as land 44 and bodies of water 46, and directional indicia such as a compass 48. Such graphical representations may be displayed within individual layers tied to specific data communicated via FMAM (16, FIG. 1) and/or database server (20, FIG. 1). Such layers may be activated or deactivated and/or visually opened or closed by the operator by touching interactive toggle buttons 50 displayed on UI 80. Operators may further initiate retrieving refreshed and accurate data via touching portions of UI 80, such as portions of the flight path or aircraft icon A.

In some aspects, UI 80 may be configured to display a landing runway information display 82 adjacent a vertical display 84. The landing runway information display 82 can be configured to display landing performances of the diversion airport selected by the aircraft operator (or automatically selected by the FMAM). The landing performance data can be for a most appropriate runway selected for the diversion airport, or alternatively a comparison of performances on different runways can be performed using arrows. Relevant data such as landing weight and approach trajectory are determined using the diversion route built to the selected airport. Tabs 86 may further be selected to open or close airport information via display (e.g., 60, FIG. 3). In some aspects, runway information display 82 may provide aircraft operators with necessary details regarding landing runway information, for example, such as the runway number, runway length, and a stopping length given wet or dry runway conditions. Runway information display 82 may opened or closed by touching one or more toggle buttons 50 or tabs. In some aspects, an operator may select a button or tab to view the landing runway information display 82, or select the tab to hide the display as needed. Notably, vertical display 84 and/or airport information (60, FIG. 3) may be further displayed via UI 80. Vertical display 84 may indicate the current flight path as well as trajectory information. One or more ranges and/or diversion routes may be provided on and displayed via vertical display 84 (see e.g., FIG. 5A).

In some aspects, an operator may physically touch portions of UI 80 (e.g., icons/maps) to manipulate the dynamic aircraft icon A indicated thereon. In some aspects, an operator may manipulate dynamic aircraft icon A in order to move the dynamic icon to future points of the calculated flight path 88. The future aircraft location(s) may be dynamically indicated using a ghost aircraft icon 90, which may appear in a more transparent and/or different color than icon A in order to differentiate the current and predicted status and nature. In some aspects, UI 80 may display forecasted aircraft performance characteristics 92 for ghost aircraft icon 90, such as forecasted fuel remaining, for the updated future location along calculated flight path 88.

In some aspects, ghost aircraft icon 90 may also have an associated action range 94 which may indicate the forecasted range of the aircraft at the forecasted location given an emergency condition, such as a sick passenger onboard or an evolving situation such as fuel leaks. In some aspects, ghost aircraft icon 90 may provide operators with diversion anticipation scenarios. In some aspects, as ghost aircraft icon 90 is moved by an operator along path 88, ghost action range 94 may remain as a preliminary predication as indicated by a dashed line or a change in color of the line. When the operator releases (or discontinues touching) ghost aircraft icon 90, associated action range 94 may be consolidated within a vertical profile thinner along with wind and altitude data.

Figure 5A:
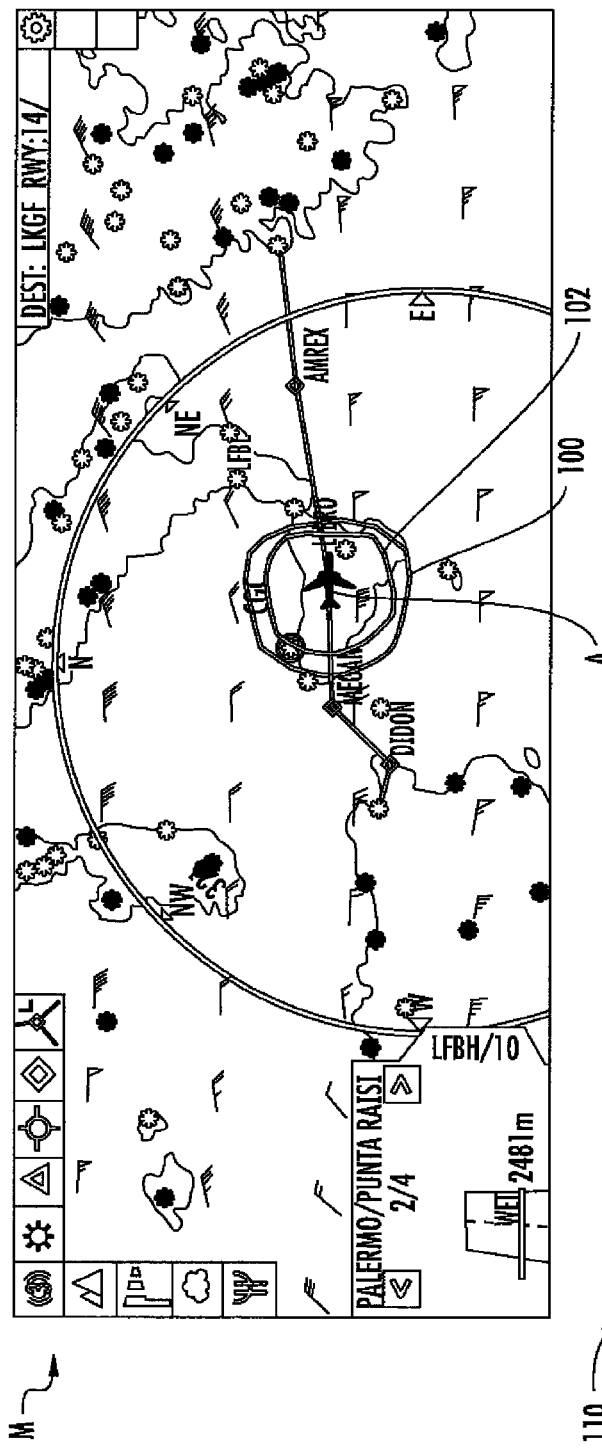
FIGS. 5A and 5B are diagrams illustrating portions of another exemplary user interface for providing flight management according to one aspect of the subject matter described herein.
Figure 5B:
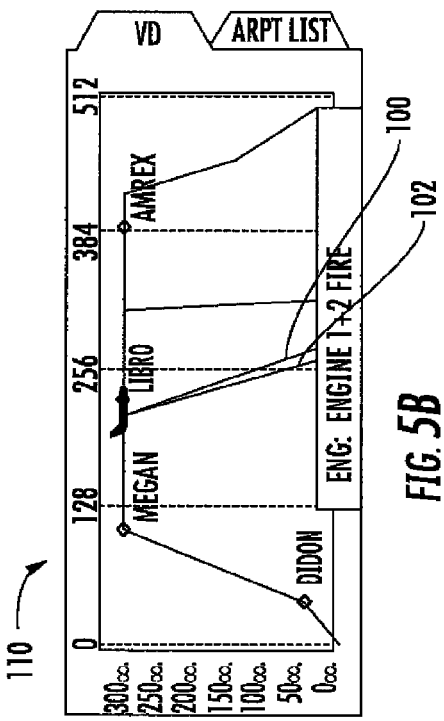

FIGS. 5A and 5B indicate portions of a UI which may display multiple ranges. In FIG. 5A, range displays are provided over portions of map M. In some aspects, each action range is displayed with a specific color code (not shown) to be distinguished on the map. For example, FIG. 5A illustrates a glide maximum range 100 and engines relight range 102 calculated and displayed about interactive aircraft icon A. In some aspects, glide maximum range 100 may correspond to a maximum reachable distance calculated based upon a continuous glide descent at a best lift-to-drag ratio speed. Glide maximum range may 100 occur when the main systems of the aircraft are out-of-order and/or when no control over descent is possible. In some aspects, engine relights range 102 may indicate a range associated with dual engine failure. Both ranges may be complementary, and assist in diversion decision making.

Notably, UI (e.g., with map M) displays reachable diversion airports and/or runways inside each action range. Such airports and/or runways may be denoted by lettered abbreviations and may be displayed using graphics (e.g., star shapes) on the map or in a list available from the ARPT LIST tab (FIG. 5B). For each reachable airport, FMAM (16, FIG. 1) computes and provides operators with various types of information regarding each airport via the touch screen. For example, landing aircraft performances and airport information may be available to operators via touch screen. Landing aircraft performances may include fuel, time to airport, weight, runway length, etc. FMAM (16, FIG. 1) may also communicate and allow for the display of recommended actions such as fuel jettison in case the landing weight is too high. Airport information may include rescue data (e.g., airports normalized rescue information), healing data, and/or commercial data. In some aspects and to be readable, only contextual airport information may be displayed directly on map M, for preselected diversion airports. Full airport data may be available on pilot request via touching tabs and/or toggle buttons 50. In some aspects, all data may be normalized in order to provide comparable decisions elements to the operators.

As FIG. 5B illustrates, one or more action ranges may also be displayed on the vertical display 110. Glide maximum range 100 may be indicated on vertical display to anticipate flight trajectory or descent. Engine relights range 102 may also be graphically displayed in terms of vertical data. Maximum and supplementary ranges may be calculated at FMAM (16, FIG. 1) and may be communicated to UI via computing platform (FIG. 1) and displayed thereon. The reachable airports or runways are those included in the action range and the airports for which landing performances are limits. Reachable airports may be displayed in a specific and/or different color codes. As FIG. 5B illustrates, the glide maximum range and the engines relight range are displayed.

In some aspects, by default a cruise level maximum range may be displayed, however, depending on the context and/or failure that may occur, the system may automatically display the appropriate action ranges, for example, if a procedure imposes a ceiling then the system will display the imposed ceiling range. Or if there is a dual engine loss, the glide maximum range may be displayed. All of the action ranges may be displayed upon request by the pilot.

Once an available diversion route (e.g., ranges 100 or 102) has been selected, it may be built. The diversion route to the selected diversion airport may be built from various parameters including a speed profile, a lateral profile, and a vertical profile. The diversion routes may take into account the specific operational constraints of the flight, such as ETOPS, obstacles, or closed airspaces even if they are not known at mission preparation as the database server (20, FIG. 1) is regularly updated by datalink (24, FIG. 1). In some aspects, the proposed diversion routes avoid volumes that should not be flown in specific areas, for example, unauthorized airspaces, closed airspaces, bad weather areas, and high mountainous areas.

In some aspects, once the diversion route is built, updated information may be indicated to the crew such as ETA, estimated fuel on board, landing performance, etc. Manual crew interaction for building a diversion route to an airport is possible through a simple airport selection (e.g., physically touching) map M which issues an explicit "divert to" command.

In some aspects, the diversion route needs to be validated by the pilot who may manually (via touch screen) modify the trajectory. An alert (e.g., text, sound, signal, etc.) may occur if he modified route is not possible. For example, where there is not enough fuel to reach the diversion airport selected by the pilot, an alert will sound. Another alternate diversion route may be displayed on map M and on the vertical display 110. After diversion route validation by the pilot, the color changes so that autopilot may be engaged on the diversion route.

In some aspects, in case of a failure even that may impact cockpit crew capacity (e.g., sickness, display system breakdown, depressurization, etc.) the choice and validation of the diversion route may be automatically made by the flight management system (FIG. 1), including the FMAM and display. The selected diversion route may include an emergency descent to an altitude allowing the cockpit crew to be aware. The flight management system (FIG. 1) may communicate the automatic emergency descent decision to the ground while the diversion route is engaged by the autopilot mode.

Figure 6A:
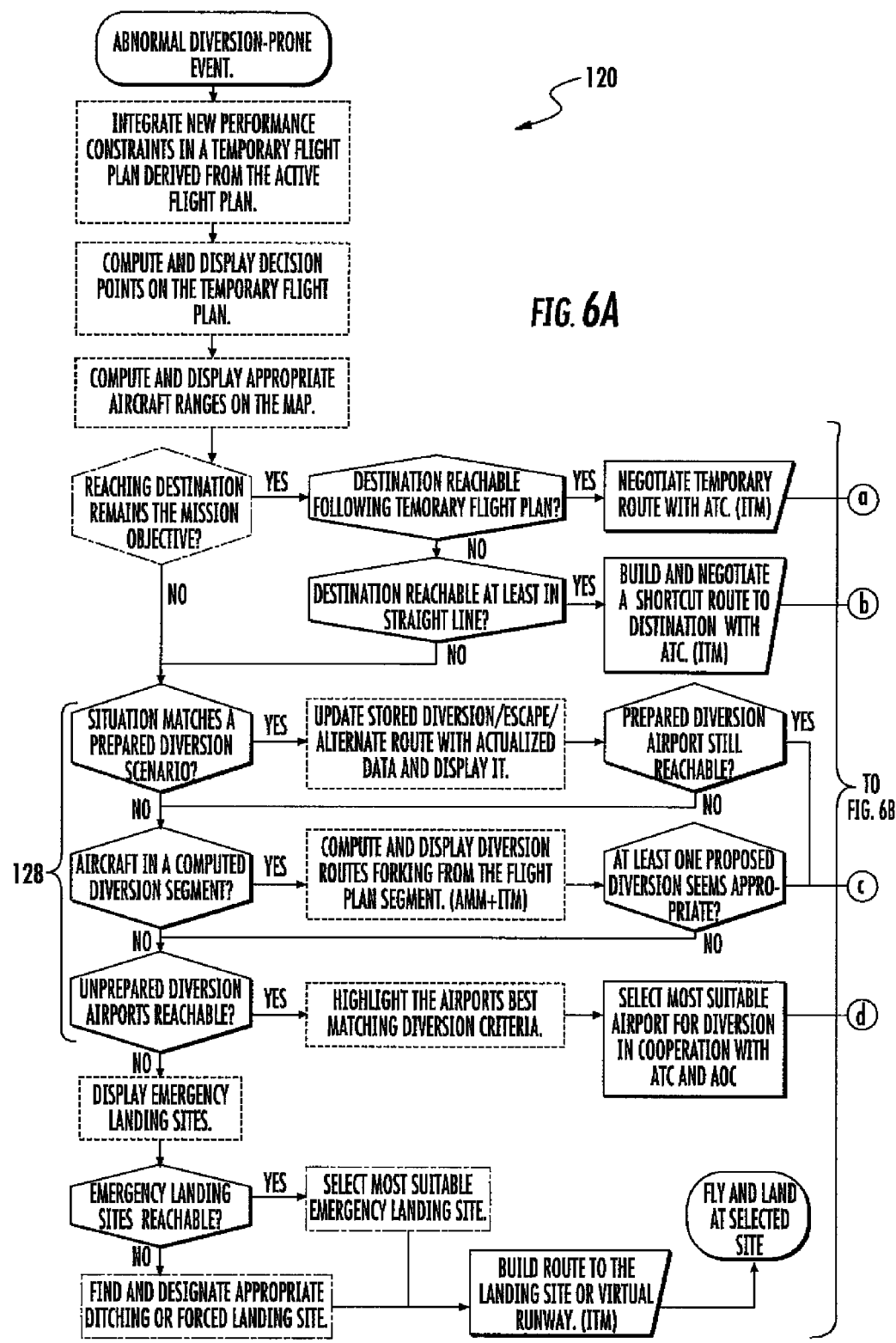
FIGS. 6A and 6B illustrate a workflow for providing flight management either in reaction to an abnormal diversion prone event, or in anticipation of a diversion prone event according to one aspect of the subject matter described herein.
Figure 6B:
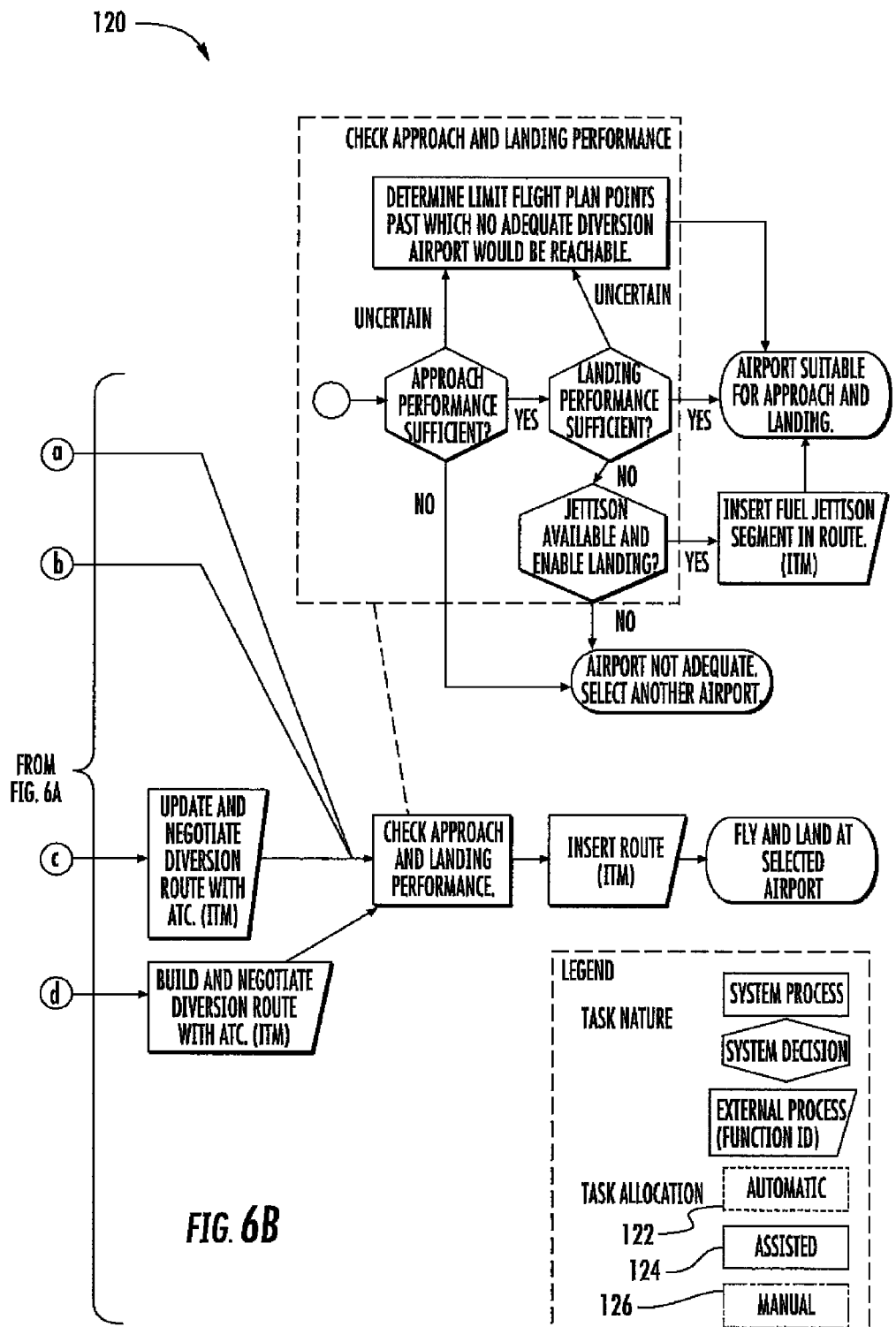

FIGS. 6A and 6B illustrate a workflow for providing flight management either in reaction to an abnormal diversion prone event, or in anticipation of a diversion prone event 120. An anticipation mode of the system can be configured to provide the same tools and cues as a reactive mode would do under real events to prepare the aircraft operator to face such situations. As FIG. 6B illustrates, flight decision points may include task allocations which may be automatic 122, assisted 124 or manual 126. System 120 may comprise a computing platform, FMAM (FIG. 1) and UI adapted to provide the flight crew with decision nodes or segments, generally designated 128. Diversion anticipation system 120 may be configured to provide operators with an awareness of diversion options with "time to decision" point information along with the flight plan. The "time to decision point" data may be set on the flight plan with a countdown for remaining time before taking the decision for diversion route.

FIGS. 6A and 6B illustrate various decision nodes 128 (e.g., in hexagonally shaped boxes). As noted above, decision nodes 128 may be automatic (e.g., computed), assisted (e.g., prepared) or manual. Manual decision nodes 128 are indicated in "dot-dashed" lines and may indicate points that are manually inserted by operators. Such decision points may be used to mark an interesting point while using the ghost aircraft (FIG. 3) and monitor progress. It may also be used as a backup to prepare and compute decision points.

Assisted or prepared decision nodes 128 may be indicated in solid lined boxes, and may include points loaded with the flight plan defined during mission preparation, for example, entry and exit points of ETOPS segments, equi-time points, and obstacle escape route entry points. Assisted decision nodes 128 may be updated with real-time data (e.g., fuel burn, wind, closed space) communicated from multiple servers.

Automatic decision nodes 128 are indicated in broken lines, and may be computed decision points automatically inserted upon a diversion event triggering awareness about the distance/time remaining until a diversion option remains available. In some aspects, some diversion scenarios may be used to anticipate abnormal events. The flight crew may play diversion scenarios and simulate diversion prone events at any point downstream of the flight plan.

Figure 7:
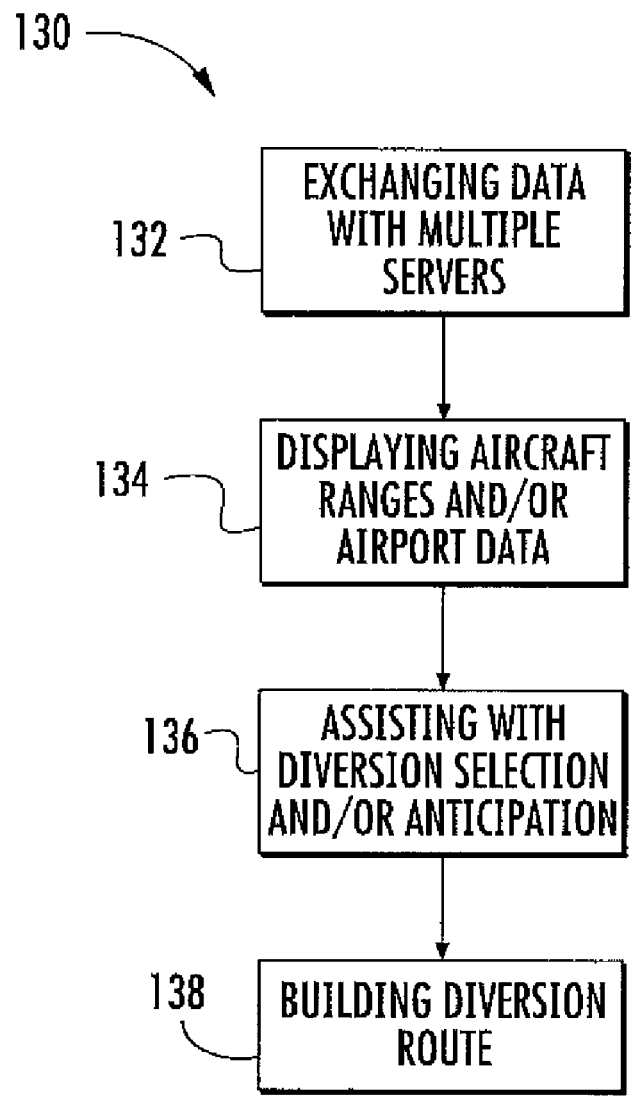
FIG. 7 is a flow chart illustrating an exemplary process for providing flight management according to one aspect of the subject matter described herein.

FIG. 7 is a flow chart diagram illustrating an exemplary process 130 for providing flight management control during an abnormal event. At step 132, a computing platform including a flight management application module (FMAM, FIG. 1) and UI may exchange data with multiple servers. Such data may be calculated (e.g., at FMAM) and processed into aircraft ranges. For example, an optional step of calculating aircraft ranges using the data exchanged with multiple servers may be performed at FMAM.

At step 134, aircraft ranges (e.g., calculated at FMAM) and/or airport data (e.g., received from multiple servers) may be displayed. In some aspects, such data may be displayed on a tactile and interactive touch screen.

As step 136, the flight management system may assist with diversion selection or anticipation. For example, multiple ranges and/or options for diversion routes may be displayed over maps and vertical profile areas of UI. In some aspects, the displayed aircraft ranges may be used when assisting with the selection of a diversion route. Airport information may also be displayed over portions of UI and may assist with selection of a diversion route. Such information may assist operators with preparing for a diversion and/or assist with anticipation of a diversion.

At step 138, the selected or anticipated diversion route may be built. In some aspects, the diversion route to the selected airport may be built via system from various parameters including a speed profile (e.g., long range, green dot, max speed, max endurance, etc.), a lateral profile, and a vertical profile. The diversion routes may be displayed on UI.

Embodiments as disclosed herein may provide one or more of the following beneficial technical effects: improved speed associated with making diversion decisions; improved quantity/quality of information available to operators during abnormal events; improved diversion anticipation; assisted diversion selection; improved and centralized display of information; improved tactile display allowing data to be manually updated and/or allow for a ghost diversion scenario.

While the aircraft flight management devices, systems, computer readable media, and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

We claim:

1. A device for providing flight management, the device comprising:
    an interactive user interface;
    at least one map displayed on the user interface;
    at least one flight icon displayed on the map;
    at least one indicator for an aircraft range, wherein the aircraft range is calculated from data exchanged with multiple servers, including at least one performance server and at least one database server;
    at least one calculated flight path and multiple, selectable diversion routes displayed on the user interface;
    an interactive ghost aircraft that is movable, by a user, along the at least one calculated flight path, wherein the interactive user interface is configured to display the interactive ghost aircraft, forecasted aircraft performance characteristics associated with the interactive ghost aircraft, and an associated action range indicating a forecasted range of the interactive ghost aircraft at a future location along the at least one calculated flight path;
    information regarding one or more reachable airports overlaid on the at least one map; and
    one or more flight plan decision points configured to delimit one diversion decision from another diversion decision and configured to offer a 'time to decision point' as a countdown to remaining time before making a diversion decision for selecting one of the multiple, selectable diversion routes displayed on the user interface, each of the one or more flight plan decision points including at least one task allocation.

2. A system for providing flight management, the system comprising:
    a computing platform comprising a processor, a memory, a flight management application module configured to receive data from multiple servers, including at least one performance server configured to access and receive performance impacting failure data associated with in-flight performance and at least one database server configured to receive and store information from sensors and databases, and to calculate one or more aircraft ranges based upon the received data;
    a user interface configured to display a map and one or more of at least one flight icon; the aircraft ranges overlaid on a portion of the map; at least one calculated flight path and multiple, selectable diversion routes; and a diversion scenario player configured to provide diversion assistance by selectively displaying information including the map, one or more of the aircraft ranges, a vertical display, and information regarding one or more reachable airports;
    wherein the user interface is configured to display an interactive ghost aircraft movable by a user along the at least one calculated flight path, forecasted aircraft performance characteristics associated with the interactive ghost aircraft, and an associated action range indicating a forecasted range of the interactive ghost aircraft at a future location along the at least one calculated flight path;

wherein the flight management application module is further configured to provide one or more flight plan decision points that delimit one diversion decision from another diversion decision and that offer a 'time to decision point' as a countdown to remaining time before making a diversion decision for selecting one of the multiple, selectable diversion routes displayed on the user interface, each of the one or more flight plan decision points including at least one task allocation;

wherein the diversion scenario player is configured to play one or more diversion scenario at any point downstream of the calculated flight path; and wherein each diversion scenario of the one or more diversion scenario is composed of (i) a flight plan segment and associated diversion airport(s); (ii) one or more diversion route to the associated diversion airport(s); and (iii) a list of abnormal events associated with the diversion scenario.

3. The system according to claim 2, wherein the one or more reachable airports are sorted according to distance.

4. The system according to claim 2, wherein the one or more reachable airports are sorted according to estimated arrival time.

5. The system according to claim 2, wherein the computer platform is configured to notify an operator if an abnormal event occurs.

6. A method for providing flight management during an abnormal event, the method comprising:

exchanging data with multiple servers, the multiple servers including at least one performance server configured to access and receive performance impacting failure data associated with in-flight performance and at least one database server configured to receive and store information from sensors and databases;

calculating aircraft ranges using the data exchanged with the multiple servers;

displaying at least one flight icon; the aircraft ranges, at least one calculated flight path, and multiple, selectable diversion routes on a user interface;

indicating, with the at least one displayed flight icon, a current position of the aircraft along the at least one calculated flight path;

notifying of an abnormal event;

providing one or more flight plan decision points configured to delimit one diversion decision from another diversion decision and configured to offer a 'time to decision point' as a countdown to remaining time before making a diversion decision for selecting one of the multiple, selectable diversion routes displayed on the user interface, each of the one or more flight plan decision points including at least one task allocation;

assisting with a selection of a diversion route using the displayed aircraft ranges; and building the diversion route;

wherein assisting with the selection of the diversion route comprises displaying an interactive ghost aircraft movable by a user along the at least one calculated flight path, forecasted aircraft performance characteristics associated with the interactive ghost aircraft, and an associated action range indicating a forecasted range of the interactive ghost aircraft at a future location along the at least one calculated flight path; and selectively displaying information including a map, the diversion route, a vertical display, and information regarding one or more airports;

wherein the diversion scenario player is configured to play one or more diversion scenario at any point downstream of the calculated flight path; and wherein each diversion scenario of the one or more diversion scenario is composed of (i) a flight plan segment and associated diversion airport(s); (ii) one or more diversion route to the associated diversion airport(s); and (iii) a list of abnormal events associated with the diversion scenario.

7. The method according to claim 6, further comprising displaying information regarding reachable airports on the user interface.

8. A non-transitory computer readable medium comprising computer executable instructions embodied in a computer readable medium that when executed by a processor of a computer control the computer to perform steps comprising:

exchanging data with multiple servers, the multiple servers including at least one performance server configured to access and receive performance impacting failure data associated with in-flight performance and at least one database server configured to receive and store information from sensors and databases;

calculating aircraft ranges using the data exchanged with the multiple servers;

displaying at least one flight icon, the aircraft ranges, at least one calculated flight path, and multiple, selectable diversion routes on a user interface;

indicating, with the at least one displayed flight icon, a current position of the aircraft along the at least one calculated flight path;

notifying of an abnormal event;

providing one or more flight plan decision points configured to delimit one diversion decision from another diversion decision and configured to offer a 'time to decision point' as a countdown to remaining time before making a diversion decision for selecting one of the multiple, selectable diversion routes displayed on the user interface, each of the one or more flight plan decision points including at least one task allocation;

assisting with a selection of a diversion route using the displayed aircraft ranges; and building the diversion route;

wherein assisting with the selection of the diversion route comprises displaying an interactive ghost aircraft movable by a user along the at least one calculated flight path, forecasted aircraft performance characteristics associated with the interactive ghost aircraft, and an associated action range indicating a forecasted range of the interactive ghost aircraft at a future location along the at least one calculated flight path;

wherein the diversion scenario player is configured to play one or more diversion scenario at any point downstream of the calculated flight path; and wherein each diversion scenario of the one or more diversion scenario is composed of (i) a flight plan segment and associated diversion airport(s); (ii) one or more diversion route to the associated diversion airport(s); and (iii) a list of abnormal events associated with the diversion scenario.

9. A system for providing emergency flight management, the system comprising:

a computing platform comprising a processor, a memory, a flight management application module configured to receive data from multiple servers, including at least one performance server configured to access and receive performance impacting failure data associated with in-flight performance and at least one database server configured to receive and store information from sensors and databases, and to calculate one or more aircraft ranges based upon the received data, a diversion selection assistance module configured to provide notification regarding an abnormal event, and a diversion anticipation module configured to provide a user with multiple decision nodes or segments;

a user interface configured to display a map and one or more of at least one flight icon, the aircraft ranges overlaid on a portion of the map, at least one calculated flight path, and multiple, selectable diversion routes;

wherein the user interface is configured to display an interactive ghost aircraft movable by a user along the at least one calculated flight path, forecasted aircraft performance characteristics associated with the interactive ghost aircraft, and an associated action range indicating a forecasted range of the interactive ghost aircraft at a future location along the at least one calculated flight path;

wherein the flight management application module is further configured to provide one or more flight plan decision points that delimit one diversion decision from another diversion decision and that offer a 'time to decision point' as a countdown to remaining time before making a diversion decision for selecting one of the multiple, selectable diversion routes displayed on the user interface, each of the one or more flight plan decision points including at least one task allocation; and wherein the diversion selection assistance module is configured to send, via the user interface, a notification to the operator regarding the abnormal event.

10. The system of claim 9, wherein the system further comprises a diversion scenario player configured to provide diversion assistance by selectively displaying information including the map, one or more of the aircraft ranges, a vertical display, and information regarding one or more reachable airports.

11. The system of claim 10, wherein the diversion scenario player is configured to play one or more diversion scenario at any point downstream of the calculated flight path.

12. The system of claim 11, wherein each diversion scenario of the one or more diversion scenario is composed of (i) a flight plan segment and associated diversion airport (s); (ii) one or more diversion route to the associated diversion airport(s); and (iii) a list of abnormal events associated with the diversion scenario.

13. A method for providing emergency flight management, the method comprising:

exchanging data with multiple servers, the multiple servers including at least one performance server configured to access and receive performance impacting failure data associated with in-flight performance and at least one database server configured to receive and store information from sensors and databases;

calculating aircraft ranges using the data exchanged with the multiple servers;

displaying at least one flight icon, the aircraft ranges, at least one calculated flight path, and multiple, selectable diversion routes on a user interface;

indicating, with the at least one displayed flight icon, a current position of the aircraft along the at least one calculated flight path;

notifying of an abnormal event;

providing one or more flight plan decision points configured to delimit one diversion decision from another diversion decision and configured to offer a 'time to decision point' as a countdown to remaining time before making a diversion decision for selecting one of the multiple, selectable diversion routes displayed on the user interface, each of the one or more flight plan decision points including at least one task allocation;

assisting with a selection of a diversion route using the displayed aircraft ranges; and building the diversion route;

wherein assisting with the selection of the diversion route comprises providing the operators with multiple decision nodes or segments, and displaying an interactive ghost aircraft movable by a user along the at least one calculated flight path, forecasted aircraft performance characteristics associated with the interactive ghost aircraft, and an associated action range indicating a forecasted range of the interactive ghost aircraft at a future location along the at least one calculated flight path.

14. The method of claim 13, further comprising playing one or more diversion scenario for a simulated diversion-prone event at a position of the interactive ghost aircraft.

15. The method of claim 14, further comprising activating the one or more diversion scenario for assessment by the user with updated data if a real-time situation matches the one or more diversion scenario.

16. The method of claim 14, further comprising providing a dynamically computed diversion solution if a real-time situation requiring a diversion solution does not match any of the one or more diversion scenario.

17. The method of claim 14, further comprising providing a dynamically computed diversion solution if a prepared diversion scenario is no longer relevant.

\* \* \* \* \*